(12) United States Patent
Pebley

(10) Patent No.: US 10,400,348 B2
(45) Date of Patent: Sep. 3, 2019

(54) HARDCOATED SOFT SUBSTRATE INCLUDING EDGE REINFORCEMENT INSERT

(71) Applicant: Rolls-Royce Corporation, Indianapolis, IN (US)

(72) Inventor: Zachary D. Pebley, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 213 days.

(21) Appl. No.: 15/273,184

(22) Filed: Sep. 22, 2016

(65) Prior Publication Data

US 2018/0080137 A1    Mar. 22, 2018

(51) Int. Cl.
| | |
|---|---|
| *B32B 3/26* | (2006.01) |
| *C25D 5/56* | (2006.01) |
| *B32B 7/08* | (2019.01) |
| *C25D 7/00* | (2006.01) |
| *B29K 101/12* | (2006.01) |
| *B29K 705/00* | (2006.01) |
| *B29L 31/30* | (2006.01) |
| *C25D 5/18* | (2006.01) |

(52) U.S. Cl.
CPC .............. *C25D 5/56* (2013.01); *B32B 3/266* (2013.01); *B32B 7/08* (2013.01); *C25D 7/00* (2013.01); *B29K 2101/12* (2013.01); *B29K 2705/00* (2013.01); *B29L 2031/3076* (2013.01); *B32B 2255/10* (2013.01); *B32B 2255/205* (2013.01); *B32B 2605/18* (2013.01); *C25D 5/18* (2013.01)

(58) Field of Classification Search
None
See application file for complete search history.

(56) References Cited

U.S. PATENT DOCUMENTS

| | | | |
|---|---|---|---|
| 3,022,870 A | | 2/1962 | John et al. |
| 3,817,540 A | * | 6/1974 | Nicholson ............ F16J 15/0825 277/595 |
| 4,980,005 A | | 12/1990 | Scollard |
| 5,380,382 A | | 1/1995 | Izdebski |
| 6,039,323 A | | 3/2000 | Mockenhaupt et al. |
| 6,050,208 A | | 4/2000 | Kennedy |
| 6,630,249 B2 | | 10/2003 | Kennedy |

(Continued)

FOREIGN PATENT DOCUMENTS

| | | |
|---|---|---|
| WO | 2015006400 A1 | 1/2015 |
| WO | 2015006493 A1 | 1/2015 |

*Primary Examiner* — Adam Krupicka
(74) *Attorney, Agent, or Firm* — Shumaker & Sieffert, P.A.

(57) ABSTRACT

In one example, an article including a composite soft substrate defining an outer edge of the substrate, wherein the composite soft substrate includes a soft substrate portion, and a reinforcement insert partially surrounded by the soft substrate portion and extending through the soft substrate portion adjacent the outer edge of the substrate, wherein the reinforcement insert forms a portion of the outer edge of the composite substrate, wherein the reinforcement member increases resistance to compression of the composite substrate at the location of the reinforcement insert compared to the soft substrate portion, and wherein the reinforcement insert defines an aperture extending through the composite substrate adjacent the outer edge of the composite substrate. The article further includes a hard coating on an outer surface of the composite soft substrate.

19 Claims, 6 Drawing Sheets

(56) References Cited

U.S. PATENT DOCUMENTS

| | | |
|---|---|---|
| 6,706,406 B1 | 3/2004 | Kennedy |
| 6,984,452 B2 | 1/2006 | Kennedy |
| 8,932,418 B2 | 1/2015 | Jendrny |
| 8,973,241 B1 | 3/2015 | Gooch |
| 2012/0121362 A1 | 5/2012 | Taylor et al. |
| 2016/0160869 A1 | 6/2016 | Roach et al. |
| 2017/0335872 A1 | 11/2017 | Belcher |

* cited by examiner

HARDCOATED SOFT SUBSTRATE INCLUDING EDGE REINFORCEMENT INSERT

TECHNICAL FIELD

In one aspect, the disclosure relates to high strength articles, e.g., high strength metal-polymer articles for use in aerospace componentry.

BACKGROUND

Aerospace components are often operated in relatively extreme environments that may expose the components to a variety of stresses or other factors including, for example, thermal cycling stress, shear forces, compression/tensile forces, vibrational/bending forces, impact forces from foreign objects, erosion and corrosion, and the like. The exposure of the aerospace components to the variety of stresses, forces, and other factors may impact the lifespan of the component, such as leading to early fatigue or failure. In some examples, aerospace components have been developed that exhibit higher strength and durability using high density metals or metal alloys. However, some high density metals or metal alloys may be relatively heavy, difficult to manufacture, and expensive making their use non-ideal for aerospace applications.

SUMMARY

In one example, the disclosure relates to an article comprising a composite soft substrate defining an outer edge of the substrate, wherein the composite soft substrate comprises a soft substrate portion, and a reinforcement insert partially surrounded by the soft substrate portion and extending through the soft substrate portion adjacent the outer edge of the substrate, wherein the reinforcement insert forms a portion of the outer edge of the composite substrate, wherein the reinforcement member increases resistance to compression of the composite substrate at the location of the reinforcement insert compared to the soft substrate portion, and wherein the reinforcement insert defines an aperture extending through the composite substrate adjacent the outer edge of the composite substrate. The article further comprises a hard coating on an outer surface of the composite soft substrate.

In another example, the disclosure relates to a method comprising forming a composite soft substrate defining an outer edge of the substrate, wherein the substrate comprises a soft substrate portion, and a reinforcement insert partially surrounded by the soft substrate portion and extending through the soft substrate portion adjacent the outer edge of the substrate, wherein the reinforcement insert forms a portion of the outer edge of the composite soft substrate, wherein the reinforcement member increases resistance to compression of the composite soft substrate at the location of the reinforcement insert compared to the soft substrate portion, and wherein the reinforcement insert defines an aperture extending through the composite soft substrate adjacent the outer edge of the composite substrate. The method further comprises forming a hard coating on an outer surface of the composite soft substrate.

The details of one or more examples are set forth in the accompanying drawings and the description below. Other features, objects, and advantages will be apparent from the description and drawings, and from the claims.

DETAILED DESCRIPTION

Figure 1:
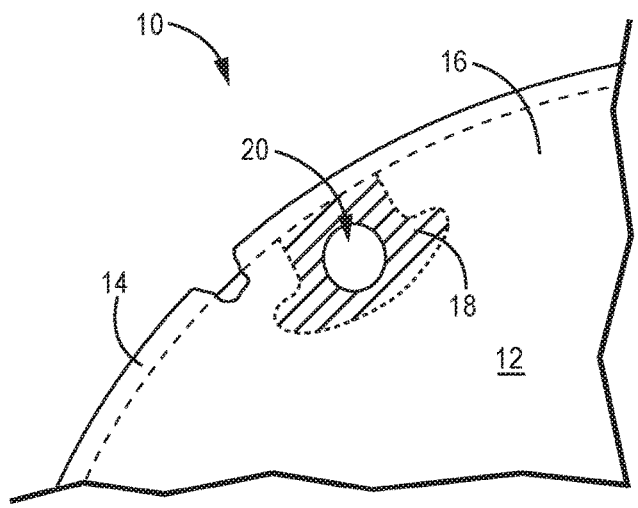
FIG. 1 is a conceptual diagram illustrating a plan view of an article including a composite soft substrate and hard coating on the outer surface of the substrate.

In some examples, the disclosure describes examples articles, assemblies, and techniques related to articles including a composite soft substrate with a hard coating on the outer surface of the composite soft substrate. While the examples in this disclosure are described primarily in the context of components for aerospace applications, such examples may include articles, assemblies, and techniques related to non-aerospace applications in which hard coated soft substrates may be employed for components. In some examples, components for aerospace applications may be formed of a soft substrate coated with a hard metallic outer coating, e.g., as compared to a component formed entirely of a metal or metal alloy, to reduce cost and/or reduce the overall weight of a component. In assemblies using such components, those components may be exposed to compressive forces when attached to other components in the assembly that may compromise the integrity of the soft substrate, e.g., by "crushing" in the soft substrate under the compressive force, as well as the hard coat on the surface of the soft substrate.

In accordance with one or more examples of the disclosure, a component including a soft substrate and hard outer coating may also include one or more reinforcement inserts extending through the soft substrate at one or more locations of the component to increase the resistance of the soft substrate to a compressive force at that location. The compressive for may be applied to the component by an attachment mechanism to attach or other secure the component to another structure, e.g., using an attachment bolt.

For example, to attach the component to another component in an assembly, a bolt or other mechanical fastening member may be extended through the attachment aperture of the reinforcement insert and then may apply a compressive force into the surface of the reinforcement insert to attach the two components, e.g., when a bolt is tightened within the aperture. The reinforcement insert in the soft substrate portion may be formed of a harder material than the soft substrate portion and increase the resistance of the composite soft substrate to the applied compressive force, e.g., as compared to the resistance of the soft substrate portion and hard coating without the presence of reinforcement member(s).

As described herein, the hard coated substrate may be referred to as a hard coated composite soft substrate. The composite soft substrate may be referred to as a composite in the sense that it includes a soft substrate portion with relatively harder reinforcement inserts at one or more locations rather than being formed only of a soft substrate material throughout the hard coated substrate. The reinforcement inserts may provide discrete areas of increased resistance to compressive forces locally while allowing for the composite soft substrate to be generally formed of the soft substrate portion in areas of the composite soft substrate in which compressive forces are not applied.

In some examples, composition of the reinforcement insert(s) may be substantially the same as that of the hard coating on the soft substrate, while in other examples, the composition may be different. Again, by employing the reinforcement insert(s), the component may exhibit a suitable resistance to compression in the areas in which compressive forces may be applied while still allowing for the use of soft substrate coated with a hard coating in areas in which resistance to compression is not required. In those portions, the component may not include any such reinforcement inserts in the soft substrate.

In some examples, the outer perimeter of a reinforcement insert may be surrounded entirely by the soft substrate and the reinforcement member may have a cylindrical shape. However, in some examples, the size and shape of a component as well as the desired location of the aperture designed to receive an attachment bolt may not allow for a cylindrical reinforcement insert with an entire outer perimeter surrounded by the soft substrate. For example, a hard coated soft substrate component may be designed to replace a component in an existing assembly that was designed for a component that was formed entirely of a metal or metal alloy substrate. In such an example, the location of an aperture for receiving an attachment bolt, e.g., near the edge of the component on a flange portion of the component, was not a design constraint due to the compression resistance exhibited by the metal or metal alloy substrate over the entire component. As such, when such a metal or metal alloy component is replaced by a hard coated soft substrate component, the location of the attachment aperture in the hard coated soft substrate may be relatively close to the outer edge of the component.

In accordance with examples of the disclosure, a hard coated soft substrate component may include a composite soft substrate in which a reinforcement insert defines a part of the outer edge wall of the composite soft substrate and is partially surrounded by the soft substrate portion. The reinforcement insert may also exhibit a shape and size that allows the soft substrate portion that partially surrounds the reinforcement insert to compress around the insert or otherwise hold the reinforcement insert in place within the soft substrate portion. The reinforcement insert may also exhibit a shape and size around the aperture in the insert to provide an outer surface for an attachment bolt to compress against for attachment of the component, e.g., rather than compress against the surface of the partially surrounding soft substrate portion. In this manner, a reinforcement insert may be located at or near the outer perimeter of a composite soft substrate to provide increased resistance to compression of the composite substrate at the location of the reinforcement insert.

Figure 2:
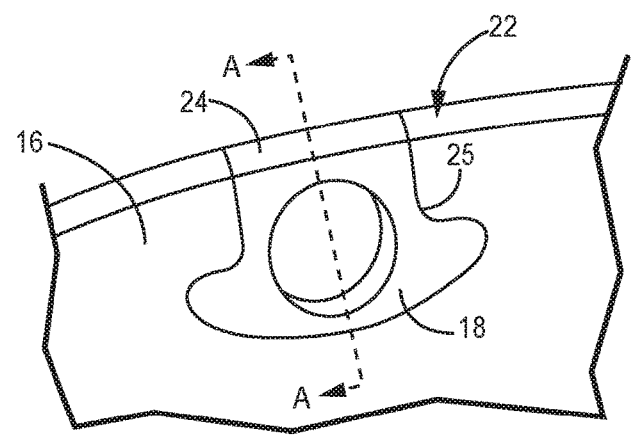
FIG. 2 is a conceptual diagram illustrating another view the component of FIG. 1 without the hard coating.

FIG. 1 is a conceptual diagram of example component 10 including composite soft substrate 12 and hard coating 14 on the outer surface of soft substrate 12. For illustrative purposes, an exposed portion of composite soft substrate 12 without hard coating 14 is shown in FIG. 1. However, hard coating 14 may cover substantially the entire outer surface of composite soft substrate 12. In other examples, hard coating 14 may only cover a portion of composite soft substrate 12. FIG. 2 is a conceptual diagram illustrating component 10 of FIG. 1 with hard coating 14 entirely removed for purposes of illustration.

Component 10 is shown in FIG. 1 as exhibiting a relatively simple geometry. However, other more complex geometries are contemplated and the geometry may be determined based on the desired use of component 10. In some examples, component 10 may form a bracket, cases, frames, brackets, supports, panels, covers, struts, pipes, tubing, conduits, and the like.

Component 10 may be any suitable article which may employ composite soft substrate 12 with hard coating 14. Composite soft substrate 12 may serve to define the general shape and size of component 10. Hard coating 14 may be formed on the outer surface of composite soft substrate 12, e.g., to provide strength and/or environmental resistance to component 10 not otherwise provided by soft substrate 12 but that is desired for the intended application of component 10.

Composite soft substrate 12 includes soft substrate portion 16 and reinforcement insert 18. Reinforcement insert 18 defines aperture 20 which extends through the reinforcement insert 18. As described herein, an attachment bolt (such as, e.g., attachment bolt 26 described below) may use aperture 20 to attach component 10 to another substrate, e.g., another component in a larger assembly.

The term "soft" and "hard" as used with regard to composite soft substrate portion 16 and hard coating 14 may refer to the relative strength of the respective features. For example, hard coating 14 may exhibit a strength that is greater than the strength of soft substrate portion 16. Strength may refer to the elastic modulus for stiffness of the material and/or hardness for susceptibility to plastic deformation of the material.

Soft substrate portion 16 and hard coating 14 may have any suitable composition. In some examples, soft substrate portion 16 may be a polymer substrate (e.g., plastic substrate) including one or more polymers, a metal substrate comprising metal or metal alloys with a relative low modulus of elasticity, e.g., as compared to that of metal hard coating 14, or a low density metal foam, and/or a ceramic coating including a low porosity ceramic. Such substrates materials may be susceptible to being crushed or otherwise undesirable compression by application of a compression load via an attachment bolt for attachment of component 10 to another component. Hard coating 14 may be a metal hard coating comprising metal or metal alloys, a ceramic hard coating comprising one or more ceramics, and/or a polymer coating comprising polymers exhibiting a higher strength compared to that of soft substrate portion 16. In some examples, soft substrate portion 16 may be substantially softer than hard coating 14 (e.g., about 10 percent or less of the hardness of hard coating 14).

In some examples, soft substrate portion 16 includes a polymer-based substrate and hard coating 14 includes a metallic hard coat. The Young's Modulus of elasticity ($10^6$ psi) for polymer-based soft substrate portion 16 may be less than about typically less than about 10, and for metallic hard coating 14 may be greater than about 20, such as, e.g., greater than about 30, greater than about 40, greater than about 50.

In one example, soft substrate portion 16 is a polymer-based substrate and hard coating 14 is a high strength nano-crystalline metallic coating applied to at least a portion of a polymer-based composite substrate 12, e.g., as used to form aerospace components that exhibit improved strength and reduced weight characteristics compared to conventional titanium, steel, or other high density metal components. Example polymeric material for a polymer-based soft substrate portion 16 may include, for example, polyether ether ketone (PEEK), polyamide (PA), polyimide (PI), bis-maleimide (BMI), epoxy, phenolic polymers (e.g., polystyrene), polyesters, polyurethanes, silicone rubbers, copolymers, polymeric blends, and the like. In some examples, the polymeric material may be combined with one or more optional additives including, for example, binders, hardeners, plasticizers, antioxidants, carbon fibers, and the like. In one example, soft substrate portion 16 may include PEEK mixed with about 30% carbon fiber fill.

Soft substrate portion 16 be formed using any suitable technique based on the composition of soft substrate portion 16. For example, in the case of a polymer-based soft substrate portion, example, substrate portion 16 may be formed using a mold process in which molten polymeric material may be combined with optional additives and cast into a three-dimensional mold to form polymer-based substrate portion 16 with the desired shape. In some examples, polymeric material may be injected into a mold containing structure reinforcement fibers wherein polymeric material encases and solidifies around the reinforcement fibers to form polymer-based substrate portion 16 with the desired shape. In other examples, polymer-based substrate 16 may be fabricated as a sheet/foil, which may be substantially planar (e.g., planar or nearly planar) or sculpted into a desired shape (e.g., a panel in the shape of the leading edge of an airfoil). In the case of substrate 16 including a metal or metal alloys with a relative low modulus of elasticity, substrate 16 may be formed using a metal casting process in which molten material is cast in a three-dimensional mold to form substrate 12 with the desired shape.

As described above, reinforcement insert 18 may be included with soft substrate portion 16 as part of composite substrate 12. As will be described further below, reinforcement insert 18 may be incorporated into soft substrate portion 16 either during the formation of soft substrate portion 16 (e.g., during the molding process) or after soft substrate portion 16 has be formed (e.g., as an addition to the soft substrate portion 16 in the desired location after which substrate portion 16 may be heated to shrink or otherwise form around insert 18).

Hard coating 14 (e.g., in the form of a metallic nano-crystalline coating) of component 10 may include one or more layers of metals or metal alloys that defines an ultra-fine-grained microstructure with an average grain size less than about 50 nanometers (nm). In some examples, the reduced grain size of hard coating 14 may increase the relative tensile strength of the resultant layer as well as the overall hardness of the layer, such that hard coating 14 may be significantly stronger and more durable compared to a conventional metallic coating (e.g., coarse grain coating) of the same composition and thickness. In some examples, the increased strength and hardness of hard coating 14 may allow for the layer to remain relatively thin (e.g., between about 0.025 millimeters (mm) and about 0.15 mm) without sacrificing the desired strength and hardness characteristics of the layer. Additionally, or alternatively, depositing a relatively thin layer of hard coating 14 on composite substrate 12 may help reduce the overall weight of component 10 by reducing the volume of denser metals or metal alloys. The combination of the relatively light weight composite substrate 12 and hard coating 14 may result in a relatively high strength, relatively low weight article ideal for aerospace components.

Hard coating 14 in the form of a metallic nano-crystalline coating may define an ultra-fine-grained microstructure having average grain sizes less than about 50 nm. In some examples, the average grain size of metallic nano-crystalline coating 14 may be less than about 20 nm, such as less than about 5 nm. Hard coating 14 may include one or more pure metals or metal alloys including, for example, cobalt, nickel, copper, iron, cobalt-based alloys, nickel-based alloys, copper-based alloys, iron-based alloys, or the like deposited on at least a portion of composite soft substrate 12. In some examples, the metal or metal alloy may be selected so that hard coating 14 possesses a Young's modulus greater than about 200 gigapascal (GPa).

In examples in which hard coating 14 comprises a metallic coating, such as, e.g., a metallic nano-crystalline coating, hard coating 14 may be formed using suitable plating techniques, such as electro-deposition. For example, a composite soft substrate 12 may be suspended in suitable electrolyte solution that includes the selected metal or metal alloy for hard coating 14. A pulsed or direct current (DC) may then be applied to composite soft substrate 12 to plate the substrate with the fine-grained metal to form hard coating 14 to a desired thickness and average grain size. In some examples a pulsed current may be utilized to obtaining an average grain size less than about 20 nm.

In such examples, composite soft substrate 12 may be initially metalized in select locations with a base layer of metal to facilitate the deposition process of forming hard coating 14 on composite soft substrate 12 using electro-deposition. In some examples, the metalized base layer on composite soft substrate 12 may be produced using, for example, electroless deposition, physical vapor deposition (PVD), chemical vapor deposition (CVD), cold spraying, gas condensation, and the like. The layer formed using metallization may include one or more of the metals used to form hard coating 14.

In some examples, hard coating 14 may be configured to exhibit improved barrier protection against erosion or corrosion compared to traditional materials used for aerospace components. For example, in examples in which hard coating 14 comprises a metallic nano-crystalline coating, hard coating 14 may include a layer of nano-crystalline cobalt. The layer of nano-crystalline cobalt may impart anti-corrosion properties to component 10 as well as increased friction resistance and wear resistance to hard coating 14 compared to traditional materials used for aerospace components.

Additionally, or alternatively, hard coating 14 may be configured to contribute to the durability of component 10 to resist impact damage from foreign objects during operation. For example, to improve impact damage resistance against foreign objects, aerospace components have traditionally been formed or coated with high strength metals such as titanium. Such techniques, however, may suffer from increased costs associated with processing and raw materials. Additionally, components formed from high strength metals such as titanium tend to result in relatively dense and heavy components which may be less desirable in aerospace applications. Forming component 10 to include composite soft substrate 12 and hard coating 14, e.g., in the form of a metallic coating, may significantly reduce the weight of component 10 compared to those formed with traditional high strength metals (e.g., titanium) while also obtaining comparable or even improved impact damage resistance characteristics.

In some examples, the thickness of hard coating 14 (e.g., in the form of a metallic nano-crystalline coating) may be between about 0.025 mm and about 0.15 mm. In some examples, hard coating 14 may be about 0.13 mm (e.g., about 0.005 inches). In some examples, the overall thickness 18 of hard coating 14 may be selectively varied on different portions of composite soft substrate 12 to withstand various thermal and mechanical loads that component 10 may be subjected to during operation. For example, in areas where increased impact damage resistance is desired, e.g., the leading edge of a compressor blade, the relative thickness of hard coating 14 may be increased to impart greater strength properties in that region. Additionally, or alternatively, the thickness of hard coating 14 in regions where increased impact damage resistance is less desired, the thickness of the coating may be reduced or removed from component 10.

In some examples, hard coating 14 may include a plurality of layers. For example, in the case of a metallic nano-crystalline coating, hard coating 14 may include a plurality of metallic nano-crystalline layers rather than a single layer. In some examples, hard coat 14 includes a first and a second metallic nano-crystalline layer that are selectively tailored to produce a metallic nano-crystalline coating with desired physical, thermal, and chemical (e.g., corrosion resistance) characteristics. For example, the first metallic nano-crystalline layer may include nano-crystalline nickel or nickel-based alloy which may impart high tensile strength properties to metallic nano-crystalline coating to contribute to the overall durability of article component 10. The second metallic nano-crystalline layer may include nano-crystalline cobalt or a cobalt-based alloy, which may impart anti-corrosion properties to metallic nano-crystalline coating as well as friction resistance and wear resistance.

As shown, FIGS. 1 and 2, component 10 includes aperture 20 that extends through the thickness of composite soft substrate 12 and hard coating 14 in the location of reinforcement insert 18. Aperture 20 may be used as an attachment aperture 16 configured to receive a bolt or other mechanical hardware that allows component 10 to be attached to another component in multicomponent assembly. Reinforcement insert 18 may be covered by hard coating 14 in the finished component 10 (as represented by the dashed lines in FIG. 1, e.g.).

As shown in FIG. 2, composite soft substrate 12 defines outer edge wall 22 that extend around the perimeter of the substrate adjacent the major (top) surface of substrate 12. As located relative soft substrate portion 16, exposed edge portion 24 of reinforcement insert 18 defines a portion of outer edge wall 22 of composite substrate 12, e.g., as opposed to the entire outer edge wall 22 of composite substrate 12 being formed by soft substrate portion 16. The remaining edge 25 of reinforcement member 18 is surrounded by soft substrate portion 16 such that reinforcement member 18 is partially surrounded by soft substrate portion 16.

Figure 3:
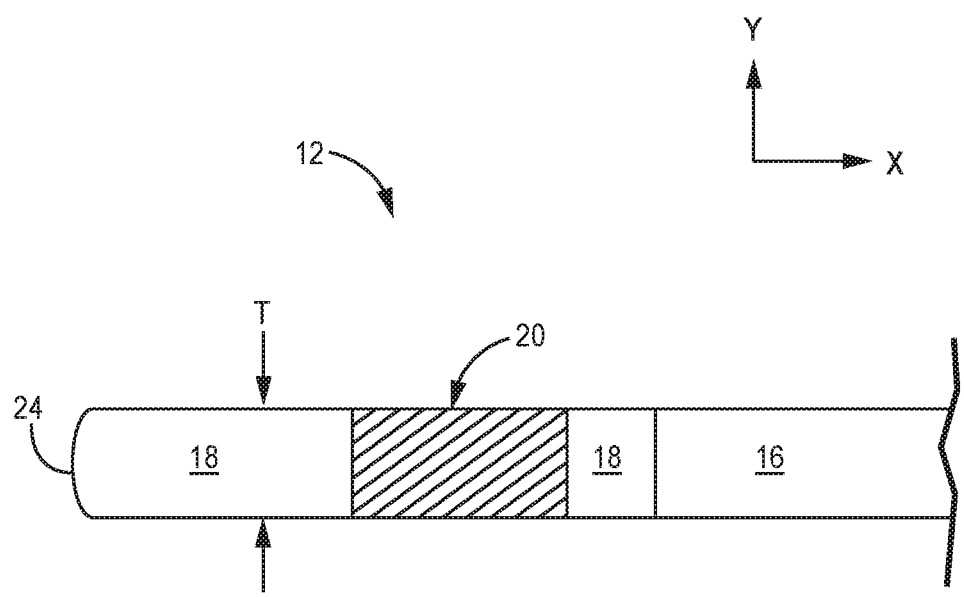
FIG. 3 is a conceptual diagram illustrating the examples article of FIG. 2 along cross-section A-A.

FIG. 3 is a conceptual diagram illustrating component 10 along cross-section A-A shown in FIG. 2. As in FIG. 2, hard coating 14 is not shown on the outer surface of composite soft substrate 12 in FIG. 3. As shown in FIG. 3, aperture 16 is defined by reinforcement insert 18 and extends through the thickness (T) of composite soft substrate 12 along the y-axis direction. Composite soft substrate 12 may have thickness of approximately 1.0 mm to approximately 250 mm although other thicknesses are contemplated. The thickness of reinforcement insert 18 and soft substrate portion 16 may be the same or may be different, and the thickness of each may vary or may be substantially constant. As the thickness of composite soft substrate 12 is reduced, there may be less benefit in terms of cost and/or weight compared to that of component 10 being formed a single material, e.g., a metal substrate.

Aperture 20 may have any suitable shape and size. In the example shown in FIGS. 1-3, aperture 20 exhibits a substantially cylindrical shape with diameter that substantially corresponds to the shape and diameter of an attachment bolt to extend through aperture 20, e.g., to attached component 10 to another component in a larger assembly. Aperture 20 may be located relatively close to composite substrate outer edge 22. In some examples, the distance from aperture 20 to composite substrate outer edge 22 may result in the use of a reinforcement member that is cylindrical and completely surrounded by soft substrate portion 16 impractical. As described herein, examples of the disclosure may employ a configuration in which edge portion 24 of reinforcement insert 18 forms a portion of outer edge 22 of composite substrate 22 and not completely surrounded by soft substrate portion 16. In some examples, if a wall thickness of a reinforcement insert would be equal to or greater than about two thirds (⅔) of the distance from aperture 20 and outer edge 22, then reinforcement insert 18 that defines an edge portion 24 of outer 22 may be employed. For example, if the distance from aperture 20 to outer edge 22 is about 150 millimeters (mm) and the wall thickness of a cylindrical insert is about 100 mm or more, a reinforcement insert such as reinforcement insert 18 may be used instead.

Reinforcement insert 18 may increase the resistance of composite soft substrate 12 and, more generally, component 10, to a compressive force applied adjacent to aperture 20, e.g., in a direction substantially orthogonal to the surface plane of component 10 and/or a direction substantially parallel to the direction that aperture 20 extends through composite soft substrate 12. For example, when substantially the same compressive force is applied in the negative y-axis direction (as indicated in FIG. 3) to composite substrate 12 adjacent to the outer perimeter of aperture 20 and a component formed of soft substrate portion 16 without reinforcement insert 18, composite soft substrate 12 may compress (e.g., in the negative y-axis direction) around aperture 20 less than the soft substrate of the other component without a reinforcement insert. In another example, composite soft substrate 12 may not substantially compress (e.g., in the negative y-axis direction) around aperture 20 while the soft substrate of the other component without reinforcement insert 18 does compress around aperture 20 when substantially the same force is applied.

Reinforcement insert 18 may be formed of any suitable material that allows for reinforcement insert 18 to function as described herein. Reinforcement insert 18 may have a composition that is different than that of soft substrate portion 16. In some examples, reinforcement insert 18 may include any material which allows reinforcement insert 18 to exhibit sufficiently high compressive strength to resist a threshold compressive force without allowing substantial compressing under the applied force. The threshold compressive force may be a force anticipated to be applied by an attachment mechanism to substrate 12 for attachment of component 10 to another component. In some examples, reinforcement insert 18 may have substantially the same composition and/or be formed of the same material as that of hard coat 14. The composition of reinforcement insert 18 may be selected to be compatible with the composition of soft substrate portion 16 and hard coating 14, e.g., to avoid deleterious interactions such as, e.g., galvanic corrosion. In some examples, the composition of reinforcement insert 18 may include stainless steel, aluminum, nickel, or alloys thereof.

Figure 4:
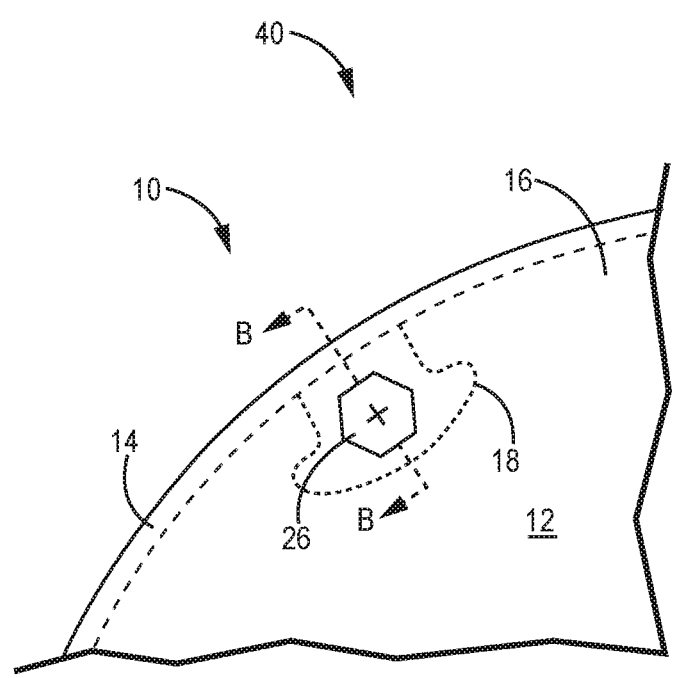
FIG. 4 is a conceptual diagram illustrating an assembly including the article of FIGS. 1-3 and an attachment bolt.
Figure 5:
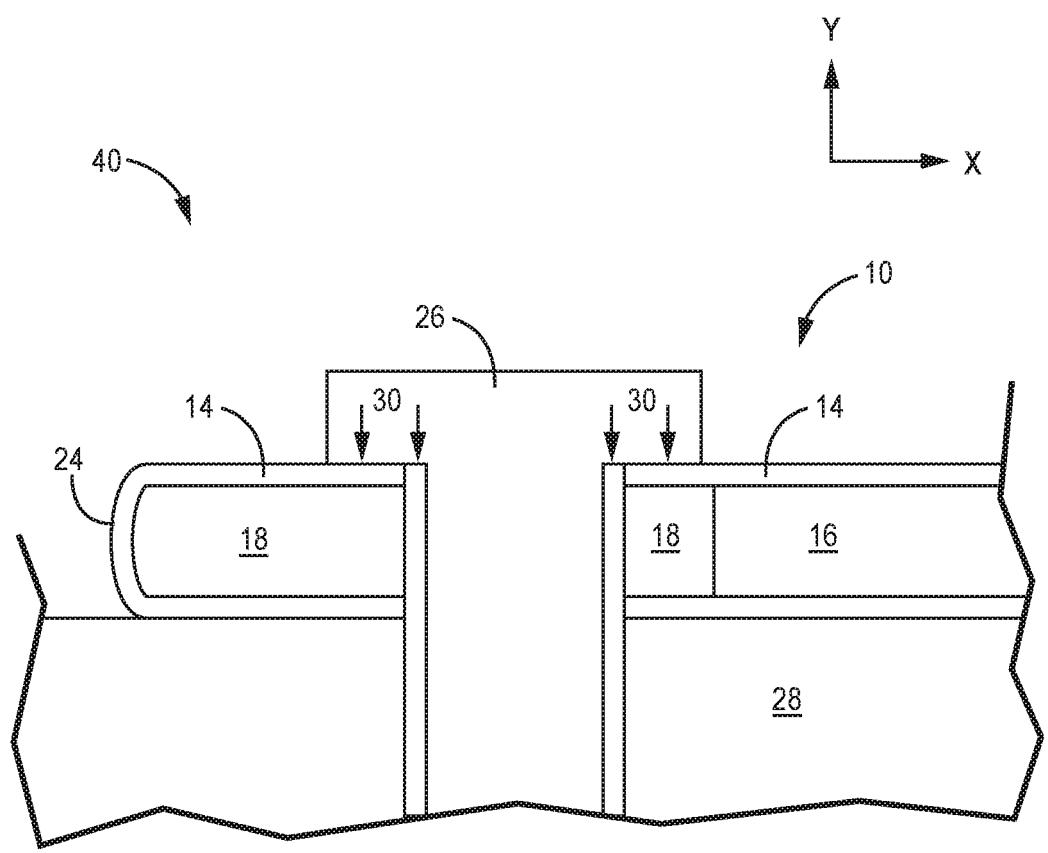
FIG. 5 is a conceptual diagram illustrating a cross-sectional view of the assembly of FIG. 4 attached to another substrate.

FIG. 4 is a conceptual diagram illustrating an assembly 40 including component 10 of FIG. 1 with attachment bolt 26 located within aperture 20 of reinforcement insert 18. FIG. 5 is a conceptual diagram illustrating assembly 40 along cross-section B-B shown in FIG. 4.

As shown, assembly also includes attachment bolt 26 and base substrate 28 (substrate 28 is not shown in FIG. 4). Base substrate 28 is located below component 10 and an attachment aperture in base substrate 22 is aligned with aperture 20 of component 10 defined by reinforcement insert 18. Attachment bolt 26 extends through aperture 20 and the attachment aperture in base substrate 28. As shown, the flanged portion or head of bolt 26 rests on the top surface of component 10 adjacent aperture 20. To attach or otherwise fix component 10 to base substrate 28, a nut (not shown) may be threaded on the opposite end of bolt 26 and tightened. When tightened, the flanged portion of bolt 24 may apply a compressive force 30 on the opposing surface of component 10, e.g., in substantially the negative y-axis. While the flanged portion of bolt 26 is shown as being in direct contact with component 10 at hard coating 14, in other examples, the force 30 may be applied indirectly, e.g., via one or more washers located between the flanged portion of bolt 26 and component 10. In some examples, the applied compressive force 30 is a static force when component 10 is designed to be permanently attached, or for extended periods, to substrate 28 in the assembly.

Reinforcement insert 18 may increase the resistance of component 10, to the compressive force 30 applied adjacent to aperture 20. For example, when substantially the same compressive force is applied in the negative y-axis direction (as indicated in FIG. 5) to component 10 adjacent to the outer perimeter of aperture 20 and a component formed of soft substrate portion 16 and hard coating 14 without reinforcement insert 18, component 10 may compress (e.g., in the negative y-axis direction) around aperture 20 less than the soft substrate and hard coating of the other component without a reinforcement insert. In another example, component 10 may not substantially compress (e.g., in the negative y-axis direction) around aperture 20 while the soft substrate portion and hard coating of the other component without reinforcement insert 18 does compress around aperture 20 when substantially the same force is applied. In some examples, the compressive force may be sufficient to compromise the integrity of hard coating 14, e.g., through perforation or by substantially disbanding hard coating 14 from soft substrate portion 16 if reinforcement member 18 was not included in component 10.

Figure 6:
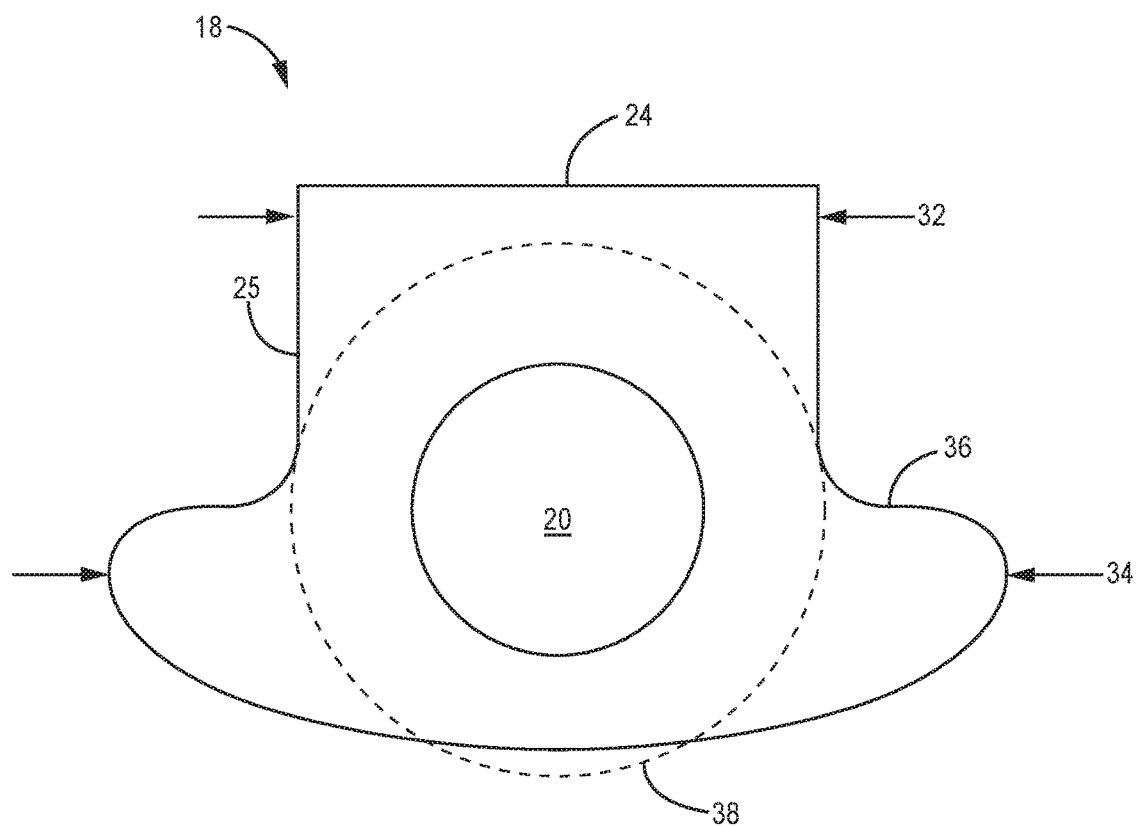
FIG. 6 is a conceptual diagram illustrating the example reinforcement insert of the articles of FIGS. 1-5.

FIG. 6 is a schematic diagram showing an enlarged view of reinforcement member 18 of component 10. As describes above, edge portion 24 of reinforcement insert 18 defines a part of outer edge wall 22 of composite soft substrate 12 and the remaining edge portion 25 may be partially surrounded by the soft substrate portion of composite soft substrate 10.

Additionally, reinforcement insert 18 may also exhibit a shape and size that allows soft substrate portion 16 compress around the insert or otherwise secure the reinforcement insert 18 in place relative soft substrate portion 16. For example, as shown in FIG. 6, reinforcement insert 18 may define a first width 32 at or near edge 24 that forms a portion of edge wall 22 of composite soft substrate 12 and also includes a protruding portion 36 that defines a second width 34 greater than the first width 32 at a location away from the edge 24. When reinforcement insert 18 is oriented as shown in FIG. 1, for example, soft substrate portion 16 may compress around protruding portion 36 and secure reinforcement insert 18 relative to soft substrate portion 16. In the example of FIG. 6, reinforcement member 18 may exhibit an oval shape in the area of greater width as well as any other suitable geometry, such as, e.g., an anvil shape, hammerhead shape, T-shape, Y-shape, and the like. Outer coating 14 may also secure reinforcement insert 18 relative to soft substrate portion 16 when application to the outer surface of composite soft substrate 12. Additional techniques may be used to secure reinforcement insert 18 in place, such as, e.g., knurling, splines, grooves, roughing the outer surface of reinforcement insert 18 and/or the like. In some examples, the additional techniques may provide for an increase in the surface area of insert 18 in contact with soft substrate portion 16 to increase contact friction between the two to hold insert 18 in place.

Reinforcement insert 18 may also be sized and shaped relative to aperture 20 such that the surface of insert 18 engages an attachment bolt 26 when inserted into aperture 20. For illustration, FIG. 6 generally illustrates a "footprint" of attachment bolt 26 when inserted into aperture 20. As described above, when inserted, attachment bolt 26 may apply a compressive force (e.g., compressive force 30) into the surface of component 10 to secure component 10 to another substrate (e.g., substrate 28). As shown in FIG. 6, based on the size and shape of reinforcement insert 18 relative to footprint 38 of bolt 26, a relatively large portion of the compressive force 30 is applied to the reinforcement insert 18, e.g., as opposed to soft substrate portion 16. Again, in this manner, reinforcement member 18 increases resistance to compression of the composite soft substrate 12 compared to a substrate formed of soft portion 16 without reinforcement insert 18. In some examples, footprint 38 may cover only the surface of reinforcement insert 18 without any of footprint 38 covering soft substrate portion 16. In other examples, footprint 38 may cover a portion of insert 18 and s portion of soft substrate portion 16.

Figure 7:
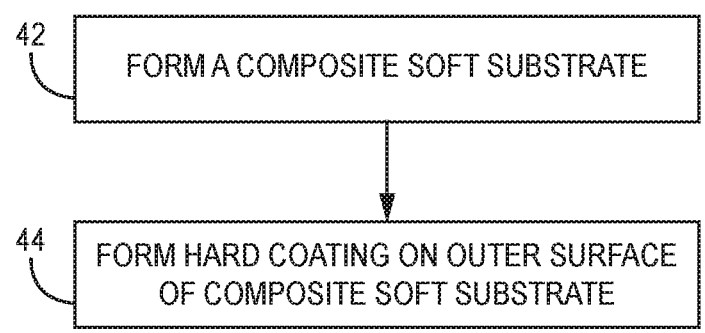
FIG. 7 is a flow diagram illustrating an example for forming an article in accordance with examples of the disclosure.

Any suitable technique may be used to form an example component in accordance with the disclosure. FIG. 7 is a flow diagram illustrating one example for forming a component in accordance with examples of the disclosure. However, other techniques are contemplated. For ease of description, example techniques are described with regard to component 10 of FIGS. 1-3 but the process may be employed in other examples.

As shown in FIG. 7, composite soft substrate 12 including soft substrate portion 16 and reinforcement member 18 may be formed (42). Hard coating 14 may then be formed on the outer surface of composite soft substrate 12 (44). Any suitable technique may be used to form composite soft substrate 12 (44). In one example, soft substrate portion 16 and reinforcement member 18 may be formed together in a mold. For example, reinforcement member 18 may be located at the desired position within a mold and then the material (e.g., polymer) of soft substrate portion 16 may be introduced (e.g., injected) into the mold. The cured/cast composite material may be subsequently removed from the mold and then coated with hard coating 14 on the outer surface, e.g., using one of the example techniques describes above for depositing hard coating 14 (44). In some examples, hard coating 14 is formed on the inner walls defining aperture 20 of reinforcement member 18 while in other examples, hard coating 14 is not formed on the inners walls defining aperture 20.

In another example, soft substrate portion 16 may first be cast/cured in a mold and then reinforcement insert 18 may be located as desired relative to soft substrate portion 16. For example, soft substrate portion 16 may be molded/cast in a mold cavity to have void in the desired location of reinforcement insert 18. Alternatively or additionally, a portion of the molded/cast soft substrate portion may be removed (e.g., cut out) to form the void in soft substrate portion 16 in the desired location of reinforcement insert 18. In either example, the void may exhibit a shape that is smaller that the shape of reinforcement insert 18, e.g., between about 0.001 inches and 0.005 inches. Soft substrate portion 16 may then be heated to allow the material of soft substrate portion 16 to expand in the area of the void, and reinforcement insert 18 may then be inserted within the expanded void. Soft substrate portion 16 may then be cooled to shrink the expanded void in a manner that clamps or otherwise secures reinforcement insert 18 to soft substrate portion 16 in the desired location. Hard coating 14 may then be formed on the outer surface of the formed composite soft substrate 12 e.g., using one of the example techniques describes above for depositing hard coating 14 (44).

Various examples have been described. These and other examples are within the scope of the following claims.

The invention claimed is:

1. An article comprising:
a composite soft substrate defining an outer edge of the substrate, wherein the composite soft substrate comprises:
a soft substrate portion,
and a reinforcement insert partially surrounded by the soft substrate portion and extending through the soft substrate portion adjacent the outer edge of the substrate, wherein the reinforcement insert forms a portion of the outer edge of the composite substrate, wherein the reinforcement member increases resistance to compression of the composite substrate at the location of the reinforcement insert compared to the soft substrate portion, and wherein the reinforcement insert defines an aperture extending through the composite substrate adjacent the outer edge of the composite substrate; and
a hard coating on an outer surface of the composite soft substrate.

2. The article of claim 1, wherein the aperture defined by the reinforcement insert is configured to receive an attachment bolt to attach the article to another substrate.

3. The article of claim 1, wherein the aperture extends through the composite soft substrate in a first direction, the article further comprising an attachment bolt extending through the aperture and applying a compressive force on the reinforcement insert in a second direction substantially parallel to a first direction, and wherein the reinforcement insert increases resistance of the composite soft substrate to the compressive force applied by the attachment bolt.

4. The article of claim 1, further comprising:
another substrate; and
an attachment bolt that attaches the substrate to the another substrate by applying a compressive force on the composite soft substrate at the location of the at least one reinforcement member, wherein the at least one reinforcement member increases resistance of the composite soft substrate to the compressive force applied by the attachment mechanism.

5. The article of claim 1, wherein the reinforcement insert defines a first width at the portion of the outer edge of the composite soft substrate, and includes a protruding section defining a second width greater than the first width at a location within the composite substrate adjacent the outer edge, wherein the soft substrate portion compresses around the reinforcement insert at the protruding section to couple the soft substrate and the reinforcement insert.

6. The article of claim 1, wherein the soft substrate portion comprises a polymer-based substrate.

7. The article of claim 1, wherein the hard coating comprises a metallic coating.

8. The article of claim 7, wherein the metallic coating comprises a metal selected from the group consisting of cobalt, nickel, copper, iron, cobalt-based alloy, nickel-based alloy, copper-based alloy, or iron-based alloy.

9. The article of claim 1, wherein the reinforcement insert comprises at least one of aluminum, stainless steel, or nickel.

10. A method comprising:
forming a composite soft substrate defining an outer edge of the substrate, wherein the substrate comprises:
a soft substrate portion,
and a reinforcement insert partially surrounded by the soft substrate portion and extending through the soft substrate portion adjacent the outer edge of the substrate, wherein the reinforcement insert forms a portion of the outer edge of the composite soft substrate, wherein the reinforcement member increases resistance to compression of the composite soft substrate at the location of the reinforcement insert compared to the soft substrate portion, and wherein the reinforcement insert defines an aperture extending through the composite soft substrate adjacent the outer edge of the composite substrate; and
forming a hard coating on an outer surface of the composite soft substrate.

11. The method of claim 10, wherein forming the composite soft substrate defining the outer edge of the substrate comprises:
locating the reinforcement insert in a mold cavity; and
subsequently introducing material of the soft substrate portion into the mold cavity to surround a portion of the reinforcement insert with the material.

12. The method of claim 10, wherein forming the composite soft substrate defining the outer edge of the substrate comprises:
introducing a material into a mold cavity to form the soft substrate portion;
removing a portion of the soft substrate portion to form a void in the soft substrate portion;
heating the soft substrate portion to expand the void;
locating the reinforcement insert into the expanded void; and
cooling the soft substrate to shrink the void such that the reinforcement insert is secured to the soft substrate.

13. The method of claim 10, wherein forming the composite soft substrate defining the outer edge of the substrate comprises:
introducing a material into a mold cavity to form the soft substrate portion, wherein the soft substrate portion defines a void;
heating the soft substrate portion to expand the void;
locating the reinforcement insert into the expanded void; and
cooling the soft substrate portion to shrink the void such that the reinforcement insert is secured to the soft substrate portion.

14. The method of claim 10, wherein the aperture defined by the reinforcement insert is configured to receive an attachment bolt to attach the article to another substrate.

15. The method of claim 10, wherein the aperture extends through the composite soft substrate in a first direction, the article further comprising an attachment bolt extending through the aperture and applying a compressive force on the reinforcement insert in a second direction substantially parallel to a first direction, and wherein the reinforcement insert increases resistance of the composite soft substrate to the compressive force applied by the attachment bolt.

16. The method of claim 10, further comprising:
    another substrate; and
    an attachment bolt that attaches the substrate to the another substrate by applying a compressive force on the composite soft substrate at the location of the at least one reinforcement member, wherein the at least one reinforcement member increases resistance of the composite soft substrate to the compressive force applied by the attachment mechanism.

17. The method of claim 10, wherein the reinforcement insert defines a first width at the portion of the outer edge of the composite soft substrate, and includes a protruding section defining a second width greater than the first width at a location within the composite substrate adjacent the outer edge, wherein the soft substrate portion compresses around the reinforcement insert at the protruding section to couple the soft substrate and the reinforcement insert.

18. The method of claim 10, wherein the soft substrate portion comprises a polymer-based substrate.

19. The method of claim 10, wherein the hard coating comprises a metallic coating.

\* \* \* \* \*